United States Patent
Muller et al.

(10) Patent No.: US 9,499,157 B2
(45) Date of Patent: Nov. 22, 2016

(54) METHOD AND SYSTEM FOR CONTROLLING A HYBRID VEHICLE

(71) Applicant: GM GLOBAL TECHNOLOGY OPERATIONS LLC, Detroit, MI (US)

(72) Inventors: Brett T. Muller, Milford, MI (US); Travis James Trippel, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 110 days.

(21) Appl. No.: 14/339,750

(22) Filed: Jul. 24, 2014

(65) Prior Publication Data

US 2016/0023649 A1    Jan. 28, 2016

(51) Int. Cl.
| | | |
|---|---|---|
| *B60W 20/00* | (2016.01) | |
| *G01C 21/26* | (2006.01) | |
| *B60W 10/06* | (2006.01) | |
| *B60W 10/08* | (2006.01) | |
| *B60W 10/26* | (2006.01) | |

(52) U.S. Cl.
CPC ............ *B60W 20/106* (2013.01); *B60W 10/06* (2013.01); *B60W 10/08* (2013.01); *B60W 10/26* (2013.01); *B60W 20/12* (2016.01); *G01C 21/26* (2013.01); *B60W 2510/244* (2013.01); *B60W 2550/142* (2013.01); *B60W 2550/143* (2013.01); *B60W 2550/302* (2013.01); *B60W 2710/244* (2013.01); *Y02T 10/6286* (2013.01)

(58) Field of Classification Search
CPC .................... B60W 50/082; B60W 30/18136; B60W 20/00
USPC .................... 701/22, 33.4; 180/65.265, 65.21
See application file for complete search history.

(56) References Cited

U.S. PATENT DOCUMENTS

| | | | | |
|---|---|---|---|---|
| 8,655,532 | B2* | 2/2014 | Bhattarai | B60W 50/082 701/22 |
| 8,918,240 | B2* | 12/2014 | Manickaraj | B60W 20/00 180/65.8 |
| 2011/0202216 | A1* | 8/2011 | Thai-Tang | B60W 10/08 701/22 |
| 2011/0224868 | A1* | 9/2011 | Collings, III | B60L 11/1857 701/33.4 |
| 2013/0006458 | A1* | 1/2013 | Bhattarai | B60W 50/082 701/22 |
| 2013/0066493 | A1* | 3/2013 | Martin | B60W 30/18136 701/22 |
| 2014/0277878 | A1* | 9/2014 | Manickaraj | B60W 20/00 701/22 |
| 2015/0307081 | A1* | 10/2015 | West | B60W 10/115 701/22 |

* cited by examiner

*Primary Examiner* — Thomas G Black
*Assistant Examiner* — Wae Louie
(74) *Attorney, Agent, or Firm* — Quinn Law Group, PLLC

(57) ABSTRACT

A method for controlling a hybrid vehicle includes the following: (a) receiving route data for a trip route; (b) determining a drive profile for the trip route based on the route data and vehicle information; (c) determining an energy deficit distribution based on an adjusted tractive power distribution defined by the drive profile compared with a generator power of the vehicle; (d) determining a minimum energy requirement energy deficit distribution; (e) determining a state of charge (SOC) threshold based on the minimum energy requirement; and (f) commanding the powertrain to operate in a charging mode when the SOC threshold is greater than the SOC of an energy storage device of the vehicle. The charging mode may be one of a condensed charging mode, a standard charging mode, and a prolonged charging mode.

20 Claims, 3 Drawing Sheets

METHOD AND SYSTEM FOR CONTROLLING A HYBRID VEHICLE

TECHNICAL FIELD

The present disclosure relates to a method and system for controlling a hybrid vehicle, and specifically, to controlling the state of charge of a rechargeable energy storage device of a hybrid vehicle.

BACKGROUND

A plug-in hybrid vehicle includes a transmission, an internal combustion engine, an electric motor-generator, and a rechargeable energy storage device such as a battery. Accordingly, the vehicle can be propelled by the internal combustion engine, the electric motor, or both. Sometimes, the vehicle may be solely driven by the electric motor powered by a rechargeable battery. Sometimes, the vehicle may provide an option to the user to manually select a drive mode known as mountain mode, when the vehicle user anticipates driving in mountainous regions where the vehicle is expected to climb steep uphill grades or drive in very hilly terrain. In mountain mode, the vehicle is commanded to charge the battery to a predetermined state of charge (SOC), which may be referred to as the mountain mode SOC, and to maintain a reserve electrical charge of the battery at the mountain mode SOC to provide a minimum level of grade climbing performance. The predetermined value for the mountain mode SOC is independent of, e.g., not variable with, the actual use conditions of the vehicle, such that the mountain mode SOC may be in excess of the actual road load energy required by the vehicle to complete the trip. While driving in mountain mode and due to the charging requirements of mountain mode, the vehicle may have less responsive acceleration. If mountain mode is not selected by the vehicle user while driving in mountainous regions, propulsion power may be reduced and the vehicle performance limited, which may result in increased fuel consumption.

SUMMARY

A method and system for adaptively controlling the state of charge (SOC) of an energy storage device of a hybrid vehicle for a specified trip route is provided, where the charging mode of the vehicle and the state of charge threshold to which the energy storage device is charged during the trip route is varied based on a minimum energy requirement (MER) dynamically determined for a drive profile based on the specific trip route, such that the occurrence of an energy deficit and energy deficit related performance effects such as reduced propulsion power are avoided during vehicle operation along the trip route. The method and system described herein is advantaged, for example, in contrast to a manually selected mountain mode which continuously maintains the state of charge of the energy storage deficit at a relatively high and arbitrary value, by selectively charging the energy storage device to the minimum state of charge required to avoid the occurrence of an energy deficit, and by charging the energy storage device only when an energy deficit is indicated using a charging mode which is most efficient for an available charging time. The system and method may analyze the drive profile in a series of profile windows each representing a trip segment of the trip route defining the drive profile, such that the minimum energy requirement can be evaluated and reevaluated dynamically as the vehicle travels the trip route, to adaptively adjust the minimum energy requirement and SOC threshold during the duration of the trip.

The method and system provided herein uses a minimum energy requirement (MER) determined by a drive profile to control operation of the hybrid vehicle by commanding the vehicle to transition between operating in the charge-depleting (normal) mode, the charge-sustaining (hold) mode, and a plurality of charging modes of the hybrid vehicle in order to optimize the use of electrical energy, minimize emissions, and maximize fuel economy. In one example, the plurality of charging modes includes a standard charging mode, a prolonged charging mode, and a condensed charging mode. The minimum energy requirement is determined based on an energy deficit distribution developed for a specific trip route, and a state of charge (SOC) threshold is defined based on the minimum energy requirement. The SOC threshold is the minimum SOC required to be available from the energy storage device of the vehicle to avoid occurrence of an energy deficit during the trip route, where the energy deficit is identified from the energy deficit distribution. The drive profile may be analyzed in a series of subsequent profile windows, such that the minimum energy requirement and the SOC threshold may vary over the duration of the trip route defining the drive profile, and the vehicle may be transitioned between the charge-depleting, charge-sustaining and charging modes as the minimum energy requirement varies along the trip route. The SOC threshold is compared to the SOC of the energy storage device and when the SOC threshold exceeds the SOC of the energy storage device, the vehicle is selectively commanded to operate in one of a standard charging mode, a condensed charging mode, and a prolonged charging mode to charge the energy storage device to the SOC threshold in sufficient time to avoid occurrence of the energy deficit defining the minimum energy requirement. The charging mode is selected from one of the condensed, standard and prolonged charging modes based on selecting the most efficient charging mode which will charge the energy storage device to the SOC threshold in the available charging time, e.g., prior to occurrence of an energy deficit incident, such that the energy deficit incident can be prevented from occurring. By adaptively determining the minimum energy requirement for the specified trip route, and/or for trip segments defined by the trip route, the SOC threshold can be varied as defined by the trip route, such that the energy storage device is only charged to the state of charge required to offset the occurrence of an energy deficit incident, and only when an energy deficit is indicated.

The system and method relates to a hybrid vehicle including a powertrain which can be selectively operated in a charging depleting mode, a charge-sustaining mode, and a charging mode. In the charge-depleting (CD) mode, the hybrid vehicle uses the electrical energy from the energy storage device to propel the vehicle. The charge-depleting mode may also be referred to herein as the normal mode of the vehicle. The vehicle in the charge-depleting mode may operate in one of a fully electric mode (electric mode) where the vehicle is powered only by energy stored in the energy storage device, and an extended range mode (ERM) where the vehicle is powered by electricity produced by a fuel powered engine of the vehicle. In the charge-sustaining mode, also known as a hold mode, the hybrid vehicle uses energy primarily from the fuel powered engine to propel the vehicle and thus reserves (e.g., holds) the battery charge at the then current state of charge. By way of example, the fuel powered engine may be an internal combustion engine. In a charging mode, the hybrid vehicle uses energy from the internal combustion engine transferred to a motor-generator to charge an energy storage device (e.g., high voltage battery) in the vehicle using the motor-generator in generating mode. During vehicle operation, the hybrid vehicle can shift between charging mode, charge-depleting mode and charge-sustaining (e.g., hold) mode.

The powertrain includes an internal combustion engine, an electric motor-generator characterized by a generator power, a control module, and an energy storage device. The energy storage device is configured to supply electrical energy to the electric motor-generator. The control module is programmed to execute the method described herein, which in one embodiment, includes the following steps: (a) receiving, via the control module, route data regarding a trip route; (b) determining, via the control module, a drive profile for the trip route based, at least in part, on the route data, wherein the drive profile includes an adjusted tractive power distribution and the generator power; (c) determining, via the control module, an energy deficit distribution based on the drive profile, wherein the energy deficit distribution defines an energy deficit when the adjusted tractive power exceeds the generator power; (d) determining, via the control module, a minimum energy requirement based on the energy deficit; (e) determining, via the control module, a state of charge (SOC) threshold defined by the minimum energy requirement; (f) comparing, via the control module, a state of charge of the energy storage device to the SOC threshold; and (g) commanding the powertrain, via the control module, to transition to a charging mode and to charge the energy storage device to the SOC threshold when the SOC threshold exceeds a state of charge of the energy storage device to offset the energy deficit. The method may further include commanding the powertrain, via the control module, to transition to a charge-sustaining mode when the state of charge of the energy storage device equals the SOC threshold; and commanding the powertrain, via the control module, to transition to a charge-depleting mode when the minimum energy requirement is zero. Determining the adjusted tractive power distribution includes applying, via the control module, an adjustment factor to a tractive power distribution of the desired trip based, at least in part, on the route data and vehicle information.

In another embodiment, the method includes the following steps: (a) receiving, via the control module, route data regarding a desired trip; (b) determining, via the control module, a drive profile for the desired trip based, at least in part, on the route data, where the drive profile includes an adjusted tractive power distribution and the generator power; (c) determining, via the control module, an energy deficit distribution based on the drive profile; (d) determining, via the control module, a first profile window of the drive profile; (e) determining, via the control module, whether the first profile window includes at least one energy deficit incident defined by the energy deficit distribution, at least in part, when the adjusted tractive power exceeds the generator power. When the first profile window is determined to not include at least one energy deficit incident, the control module commands the powertrain to operate in one of a charge-depleting mode and a charge-sustaining mode. When the first profile window is determined to include at least one energy deficit incident, the control module determines a maximum energy deficit defined by the at least one energy deficit incident included in the first profile window; determines an initial state of charge (SOC) threshold where the initial SOC threshold is defined by the maximum energy deficit of the first profile window; compares the control module, a state of charge of the energy storage device to the initial SOC threshold; and commands the powertrain to operate in the charging mode and to charge the energy storage device to the initial SOC threshold when the initial SOC threshold exceeds the state of charge of the energy storage device.

The method may further include the steps of: determining, via the control module, a plurality of profile windows of the drive profile; and determining, via the control module, whether each respective profile window of the plurality of profile windows includes at least one energy deficit incident. When the respective profile window is determined to not include at least one energy deficit incident, the method continues with commanding the powertrain, via the control module, to operate in one of a charge-depleting mode and a charge-sustaining mode. When the respective profile window is determined to include at least one energy deficit incident, the method continues with determining, via the control module, a maximum energy deficit defined by the at least one energy deficit incident included in the respective profile window; determining, via the control module, a respective state of charge (SOC) threshold for the respective profile window, where the respective SOC threshold is defined by the maximum energy deficit of the respective profile window; comparing, via the control module, the state of charge of the energy storage device to the respective SOC threshold of the respective profile window; and commanding the powertrain, via the control module, to operate in the charging mode and to charge the energy storage device to the respective SOC threshold of the respective profile window when the respective SOC threshold of the respective profile window exceeds the state of charge of the energy storage device.

The above features and advantages and other features and advantages of the present invention are readily apparent from the following detailed description of the best modes for carrying out the invention when taken in connection with the accompanying drawings.

DETAILED DESCRIPTION

Figure 1:
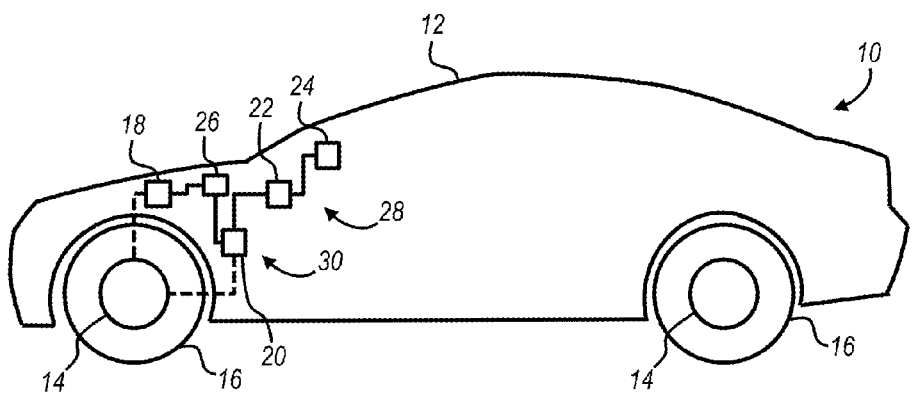
FIG. 1 is a schematic diagram of a hybrid vehicle.

Referring to the drawings in which like elements are identified with identical numerals throughout, FIG. 1 illustrates a hybrid vehicle 10. As non-limiting examples, the hybrid vehicle 10 may be a plug-in hybrid electric vehicle (PHEV) or an extended-range electric vehicle (EREV). In the depicted embodiment, the hybrid vehicle 10 includes a vehicle body 12 and a plurality of wheels 14 operatively coupled to the vehicle body 12. Each wheel 14 is coupled to a tire 16. The hybrid vehicle 10 further includes a powertrain 30. The powertrain 30 includes a fuel powered engine 18 operatively coupled to at least one of the wheels 14. By way of example, the fuel powered engine 18 may be an internal combustion engine. In operation, the internal combustion engine 18 can propel the vehicle 10 by applying torque to the wheels 14.

The powertrain 30 additionally includes an electric motor-generator 20 and an energy storage device 22 electrically connected to the electric motor-generator 20. The energy storage device 22 may be a battery, battery, pack, fuel cell, or a combination thereof and can supply electrical energy to the electric motor-generator 20. The energy storage device 22 may also be referred to herein as a high voltage battery. Aside from being electrically connected to the energy storage device 22, the electric motor-generator 20 is operatively coupled to the internal combustion engine 18 and can therefore receive mechanical energy (e.g., torque) from the internal combustion engine 18. The electric motor-generator 20 is also operatively coupled to at least one of the wheels 14 and can therefore be used to drive the wheels 14.

The electric motor-generator 20 can operate in motoring mode and generating mode. In motoring mode, the electric motor-generator 20 can convert electrical energy received from the energy storage device 22 and convert the electrical energy into mechanical energy (e.g., torque). When operating in the motoring mode, the electric motor-generator 20 can transmit mechanical energy (e.g., torque) to the wheels 14 in order to propel the vehicle 10. In generating mode, the electric motor-generator 20 can receive mechanical energy (e.g., torque) from the internal combustion engine 18 and convert the mechanical energy into electrical energy. The electrical energy generated by the electric motor-generator 20 can then be transmitted to the energy storage device 22.

The powertrain 30 and the hybrid vehicle 10 can operate in a charge-depleting mode, a charge-sustaining mode, and a charging mode. During operation of vehicle 10, the hybrid vehicle 10 can transition between the charging mode, the charge-depleting mode and the charge-sustaining (e.g., hold) mode.

In charge-depleting (CD) mode, the hybrid vehicle 10 uses the electrical energy from the energy storage device 22 to propel the vehicle 10. Accordingly, the electrical energy stored in the energy storage device 22 is depleted when the hybrid vehicle 10 is operated in the charge-depleting mode. The charge-depleting mode may also be referred to herein as the normal mode of the vehicle 10. The vehicle 10 in the charge-depleting mode may operate in one of a fully electric mode (electric mode) and an extended range mode (ERM). In the electric mode, the vehicle 10 in the charge-depleting mode is powered only by the energy stored in the energy storage device 22. In the extended range mode (ERM), the vehicle 10 may use energy from the internal combustion engine 18 and the energy storage device 22 when operating in charge-depleting mode.

In the charge-sustaining mode, also known as a hold mode, the hybrid vehicle 10 only uses energy from the internal combustion engine 18 to propel the vehicle 10 such that the electrical energy store in the energy storage device 22 is not depleted. Thus, in the charge-sustaining or hold mode, the state of charged (SOC) is reserved, e.g., held or maintained, at the then current SOC of the energy storage device 22 at the time the vehicle 10 enters into hold mode.

In the charging mode, the hybrid vehicle 10 uses energy from the internal combustion engine 18 transferred to the motor-generator 20 to charge the energy storage device 22 in the vehicle 10 using the motor-generator 20 in generating mode. The vehicle 10 in the charging mode may operate in one of a condensed charging mode, a prolonged charging mode, and a standard charging mode. With the vehicle 10 in the prolonged charging mode, the engine 18 is operated under conditions that optimize engine efficiency while charging the energy storage device 22 to a SOC threshold over an extended charging period of time relative to the charging time to achieve charging to the SOC threshold under standard charging mode, such that the charging time to achieve the SOC threshold is prolonged, e.g., the charging rate used to charge the energy storage device 22 in prolonged charging mode is less than the charging rate of the standard charging mode. In one example, the engine 18 is operated in prolonged charging mode under conditions that minimize fuel consumption of the powertrain 30 during the charging of the energy storage device 22 to the SOC threshold. Fuel consumption may be determined using any appropriate measurement of fuel consumption for the vehicle 10, for example, determining fuel consumption as a function of brake specific fuel consumption (BSFC). In this event, the time to charge the energy storage device 22 to the SOC threshold will be longer than the time to charge the energy storage device 22 with the engine operating under standard charging conditions, such that the BSFC of the powertrain 30 in prolonged charging mode is lower than the BSFC of the powertrain 30 in standard charging mode, and the prolonged charging time is longer than the standard charging time to achieve the SOC threshold.

With the vehicle 10 in the condensed charging mode, the powertrain 30 is operated under conditions that condense, e.g., reduce, the charging time to charge the energy storage device 22 to a SOC threshold relative to the charging time to achieve the SOC threshold under the standard charging mode such that the charging rate in condensed charging mode is greater than the charging rate in standard charging mode. As described further herein, the hybrid vehicle 10 may be operated in condensed charging mode when a minimum energy requirement (MER) is determined from a driving profile based on a trip route for the hybrid vehicle 10, and it is further determined from the driving profile that insufficient time is available under standard charging conditions to charge the energy storage device 22 to a SOC threshold target defined by the minimum energy requirement, and referred to herein as the SOC threshold. In one example, the powertrain 30 operated in condensed charging mode may have less responsive acceleration relative to acceleration of the powertrain 30 operated under standard charging conditions.

In the standard charging mode, the engine 18 operates to charge the energy storage device 22 at a standard charging rate that is less than the condensed charging rate and greater than the prolonged charging rate. The standard charging mode and/or standard charging rate may be established by calibration, to optimize engine operating conditions based on a combination of performance factors of the powertrain 30 including, for example, a combination of BSFC, acceleration responsiveness, propulsion power, emissions, etc.

A navigation system 24 is coupled to the hybrid vehicle 10. The navigation system 24 may be part of the hybrid vehicle 10 or external to the hybrid vehicle 10. Regardless of its location, the navigation system 24 can receive input data from a user regarding a desired trip. In other words, the navigation system 24 can receive input data specific to the desired trip. The input data may include, but is not limited to, the destination of the desired trip. Upon receipt of the input data from the user, the navigation system 24 may determine route data specific to the desired trip. The route data may include, but is not limited to, a starting point, a trip route, a trip distance, and a travel time. In one example, the travel time may be estimated by the navigation system 24 using known speed limits for each portion of the trip route.

As used herein, the term "trip distance" refers to a distance from the starting point to the destination of the desired trip, and the term "trip segment" refers to a portion of the trip route from one location along the trip route to a subsequent location along the trip route in the direction of the trip destination.

Figure 2:
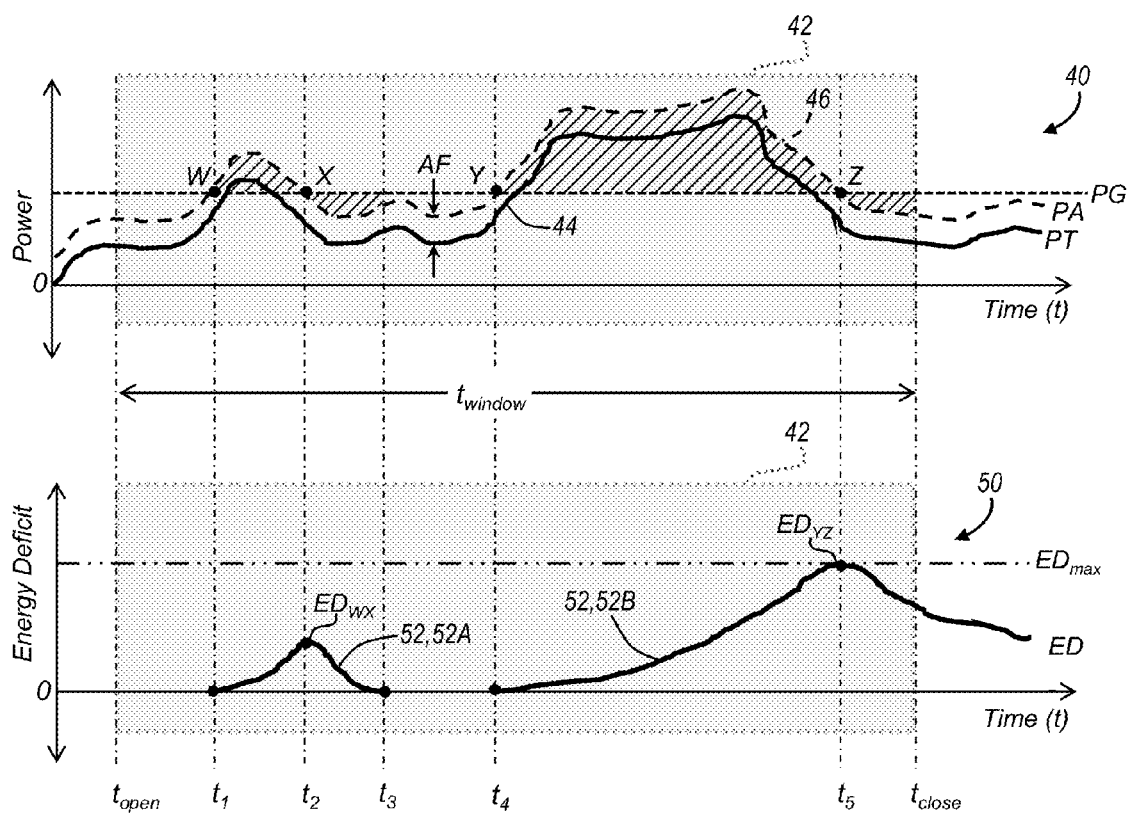
FIG. 2 is a graph illustrating a drive profile including a tractive power distribution for a trip route and an energy deficit distribution for the trip route with the horizontal axis representing time and the shaded area representing a profile window of the drive profile.

The trip route may be subdivided into a plurality of trip segments. In one example, each of the trip segments of a trip route may be of equal duration, such that the time to travel through each trip segment is substantially equal, as determined by the route data. For example, the trip route may be divided into a plurality of trip segments with each trip segment having a segment duration of 30 minutes as determined by the route data, where it would be understood that a segment associated with a relatively higher average speed limit would be of longer distance than a segment associated with a relatively lower average speed limit. In another example, each of the trip segments of a trip route may be of substantially equal distance, as determined by the route data. For example, the trip route may be divided into a plurality of trip segments with each trip segment having a segment distance of 100 kilometers, where it would be understood that the travel time through a trip segment associated with a relatively higher average speed limit would be of shorter time duration than a trip segment associated with a relatively lower average speed limit. The route data may further include grade and elevation data of the trip route, including changes in grade and elevation for each trip segment of the trip route. The trip route may be analyzed, using the method and system described herein, within a trip segment, e.g., each trip segment of the trip route may be analyzed to determine whether a minimum energy requirement is required for the trip segment. As shown in FIG. 2 and described in further detail herein, a drive profile 40 developed based on the trip route may be divided into a plurality of profile windows 42, such that each profile window 42 represents a trip segment of the trip route. In one example, the trip segments may be defined as scrolling trip segments, each trip segment overlapping a prior trip segment and extending into a subsequent trip segment, and the system may be configured to continuously loop through the method, such that the system is continuously analyzing a subsequent profile window 42 and subsequent trip segment with each loop.

The hybrid vehicle 10 further includes a control module 26 in electronic communication with a navigation system 24, the motor-generator 20, and the internal combustion engine 18. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. In the present disclosure, the control module 26 includes at least one processor and at least one associated memory and can receive route data relating to the desired trip from the navigation system 24. Accordingly, the control module 26 is in electronic communication with the navigation system 24.

The navigation system 24 and control module 26 may be part of a system 28 for controlling the hybrid vehicle 10 including the powertrain 30. The internal combustion engine 18, the electric motor-generator 20, control module 26, and energy storage device 22 may be part of the powertrain 30. The powertrain 30 is configured to propel the hybrid vehicle 10. The powertrain 30 can operate in a charge-sustaining mode, a charge-depleting mode, and a charging mode, as discussed above with respect to the hybrid vehicle 10. The control module 26 is not necessarily part of the powertrain 30.

The control module 26 is in electronic communication with the navigation system 24 such that the control module 26 can receive route data from the navigation system 24 and use the route data in combination with vehicle information from the vehicle 10 to generate a drive profile 40 for the trip route, as shown in FIG. 2, where the vertical axis represents power which may be measured, for example, in kilowatts (kW), and the horizontal axis is travel time t of the drive profile 40 for the trip route. Generating the drive profile 40 includes calculating a tractive power PT at time t along the trip route for the duration of the trip route to provide a tractive power distribution 44, then applying an adjustment factor AF to the tractive power PT to generate an adjusted tractive power PA at time t along the trip route for the duration of the trip route to provide an adjusted tractive power distribution 46. The tractive power PT requirements will vary over time t during the trip route, due to, but not limited to, variation in route data including changes in elevation and grade for each segment of the route, and changes in the speed (velocity) at which the vehicle 10 travels along the trip route, such that the tractive power PT at any one time may vary from the tractive power PT at any other time along the trip route, as shown by the tractive power distribution 44 and the adjusted tractive power distribution 46 shown in FIG. 2. The control module 26 may use speed limit information provided for the route data, for example, by the navigation system 24, to determine an expected or estimated speed at which the vehicle 10 would be operated at each time t during the trip route. The control module 26 may include a learning mode, such that the control module 26 may compare vehicle information, such as the actual (measured) speed of the vehicle 10, to route data such as a speed limit programmed into and/or received by the navigation system 24, to estimate the velocity of the vehicle 10 to be used in calculating the tractive power PT at time t during the trip route.

Generating the drive profile 40 includes the control module 26 executing an algorithm to determine the tractive power PT required for the trip route. The tractive power PT is also known as and/or referred to as the road load power, and may be measured, for example, in kilowatts (kW). By way of example, the control module 26 can use an algorithm for determining the tractive power PT such as equation (1) shown here, where $P(t)_{Tractive}$ is the tractive power PT required at time t during the trip route.

$$P(t)_{Tractive} = F_0 v + F_1 v^2 + F_2 v^3 + w(v^2_{i+1} - v^2_i) + mg\, v(\sin\theta) \quad (1)$$

As shown in FIG. 2 and as represented in equation (1) above, the tractive power PT will vary during the trip route, where the variation in PT is based at least in part on the configuration of the vehicle 10, the operating conditions of the vehicle 10, and the route data. In the example equation (1), $F_0$, $F_1$ and $F_2$ are road load coefficients, e.g., tractive power coefficients, which are specific to the configuration of the vehicle 10, and are derived from, for example, aerodynamic characteristics of the vehicle 10 which may be determined by testing of the vehicle 10 such as coast down testing, and/or may also be determined from vehicle attributes such as the mass (m) of the vehicle 10, the type and configuration of the wheels 14 and/or tires 16, the type and configuration of the brakes or braking system (not shown) of vehicle 10, etc. In the example equation (1), m represents the mass of vehicle 10, w represents the weight of vehicle 10, g represents the constant for gravity, and θ represents the grade, e.g., the angle of elevation of the road. In the example equation (1), v represents the velocity at time t of the vehicle traveling through the trip route. In one example, the control module 26 may use route data received from the navigation system 24 such as the speed limit information for the trip route programmed into and/or received by the navigation system 24, to determine the vehicle velocity v at time t along the trip route. In another example, the control module 26 may operate in a learning mode and/or execute an estimation algorithm for the vehicle velocity v at time t based on historical data available to the control module 26 for the trip route, the vehicle actual speed relative to the speed limit, a combination of these and/or other information which may be available to the control module 26, for example, information from the navigation system 24 such as road condition (e.g., construction and/or traffic information) and/or driving environment (weather, time of day) information.

The adjustment factor AF is applied to the tractive power PT to generate the adjusted tractive power PA at each time t along the trip route. The adjustment factor AF may be a calibrated value based on, for example, one or more of vehicle performance variation of the vehicle 10 which may be resultant from, for example, estimated variation in driver behavior and/or vehicle performance, such as variation in actual vehicle speed, variation in driver acceleration/deceleration behavior, variation in electrical component usage by the vehicle user/driver such as variation in heating/venting/air-conditioning (HVAC) usage, variation in powertrain performance due to variability in vehicle condition over time, etc. The adjustment factor AF may be, but is not required to be, a constant value added to the tractive power PT to generate the adjusted tractive power PA, as shown in the non-limiting example illustrated in FIG. 2. In another example, the adjustment factor AF may be a multiplier, such that the adjusted tractive power PA is determined by multiplying the tractive power PT by the adjustment factor AF, e.g., such that PA=PT·AF.

The drive profile 40 further includes the generator capability of the motor-generator 20 to generate power to charge the energy storage device 22 during operation of the vehicle 10, where the generator capability is shown in FIG. 2 as generator power PG. The generator power PG may be determined for the vehicle 10, for example, by calibration of the vehicle 10. The adjusted tractive power PA is compared with the generator power PG to generate an energy deficit distribution 50 for the drive profile 40 as shown in FIG. 2, where an energy deficit incident 52 is determined to begin at any time $t_n$ during the trip route where the adjusted tractive power PA exceeds the generator power PG. The energy deficit incident 52 continues until a subsequent time $t_{n+1}$ when the adjusted tractive power PA is less than the generator power PG, and the cumulative delta between the adjusted tractive power PA and the generator power PG, e.g., the energy deficit ED, returns to zero. More than one energy deficit incident 52 can occur during the duration of the trip route, e.g., within the drive profile 40, and/or within a profile window 42, as illustrated by the energy deficit distribution 50 shown in FIG. 2, where the profile window 42 includes an energy deficit incident 52A occurring from time $t_1$ to $t_3$, and another energy deficit incident 52B beginning at time $t_4$ and continuing through the remaining duration of the profile window 42, e.g., continuing past $t_{close}$. By way of example, the control module 26 can use an algorithm for determining the energy deficit ED during each occurrence of an energy deficit incident 52 in the drive profile, such as equation (2) shown here.

$$ED_{(m, m+1)} = \int (PA-PG)dt, \text{ integrating from } t_n \text{ when} \\ (PA-PG) > 0 \text{ until } t_{n+1} \text{ when } ED \to 0 \qquad (2)$$

As shown in FIG. 2, using the example of the energy deficit incident 52A beginning at $t_1$ when the adjusted tractive power PA exceeds the generator power PG at point W shown on the drive profile 40, e.g., at point W, (PA−PG) is greater than zero, the energy deficit ED at any time $t_1$ in the first energy deficit incident 52 is determined using the algorithm above, by integrating the cross-hatched area of the drive profile 40 bounded by PA and PG, beginning at time $t_1$ where PA first crosses PG, e.g., (PA−PG)>0, and continuing by integrating the area between PA and PG until a subsequent time $t_3$ when the cumulative area bounded by PA and PG returns to zero, e.g. As shown in FIG. 2 for the first energy deficit incident 52, the area of the drive profile 40 bounded by PA and PG is positive (PA>PG) from time $t_1$ until time $t_2$, and is negative (PA<PG) from time $t_2$ until time $t_3$, such that the energy deficit ED is increasing from $t_1$ until $t_2$, is maximized at $ED_{WX}$ at time $t_2$, and decreases from $t_2$ until $t_3$, when at time $t_3$ the energy deficit ED of the first energy deficit incident 52 returns to zero. In the example shown, another energy deficit incident 52B occurs subsequent to the energy deficit incident 52A in the drive profile 40 and within the profile window 42. The energy deficit ED of the subsequent energy deficit incident 52B is determined using the algorithm above, by integrating the cross-hatched area of the drive profile 40 bounded by PA and PG, beginning when (PA−PG)>0 at time $t_4$. During the subsequent energy deficit 52B, the area of the drive profile 40 bounded by PA and PG is positive from time $t_4$ until time $t_5$ and is negative (PA<PG) beginning at time $t_5$, such that the energy deficit ED is increasing from $t_4$ until $t_5$, is maximized at $ED_{YZ}$ at time $t_5$, and decreases beginning at time $t_5$. The minimum energy requirement (MER) to offset the energy deficit ED of an energy deficit incident 52, e.g., the minimum energy which must be available from the energy storage device 22 to prevent the occurrence of the energy deficit ED, is equal to the maximum value of the energy deficit ED of that respective energy deficit incident 52. The minimum energy requirement corresponds to and/or defines a minimum state of charge (SOC) which must be available from the energy storage device 22 prior to the time $t_n$ the energy deficit incident 52 is indicated to begin, to offset the anticipated energy deficit and thereby prevent occurrence of the energy deficit incident 52. The minimum state of charge (SOC) corresponding to the minimum energy requirement (MER) is referred to herein as the SOC threshold. Accordingly, in the example shown in FIG. 2, the minimum energy requirement to offset the initial energy deficit incident 52A is equal to $ED_{WX}$, which is the maximum energy deficit ED determined for the initial energy deficit incident 52A, and the minimum energy requirement to offset the subsequent energy deficit incident 52B is equal to $ED_{YZ}$, which is the maximum energy deficit ED determined for the subsequent energy deficit incident 52B.

The system 28 may be configured to analyze the drive profile 40 by determining the energy deficit distribution 50 in a series of profile windows, where each profile window 42

(see FIG. 2) is defined as a segment of the drive profile 40 having a duration of $t_{window}$, such that the profile window is defined as starting at a window opening time $t_{open}$ and closing at a window closing time $t_{close}$. In one example, the system 28 may be configured to analyze sequential profile windows 42, where the opening time $t_{open}$ of each respective profile window is subsequent in time to the opening time $t_{open}$ of the profile window opened immediately prior to the respective profile window. In a preferred example, the system 28 and method 90 are configured to analyze scrolling profile windows 42, such that the system 28 analyzes each profile window 42 sequentially for an energy deficit ED by looping continuously through the method 90 described herein for each profile window 42. In a preferred example, each subsequent profile window 42 overlaps a prior profile window 42, such that $t_{open}$ of the subsequent profile window 42 occurs between $t_{open}$ and $t_{close}$ of the prior profile window 42. The time duration $t_{window}$ of the profile window 42 may be determined and/or analyzed to provide sufficient vehicle operating time to transition the vehicle 10 between operating modes and/or to provide time to charge the energy storage device 22 to an SOC sufficient to provide the minimum energy requirement, e.g., to an SOC threshold, to offset the maximum energy deficit $ED_{max}$ determined for the profile window 42, in advance of the time at which the energy deficit ED occurs, such that the energy deficit ED is offset, e.g., the energy deficit incidents 52A, 52B in the profile window 42 are prevented from occurring, and vehicle performance is maintained at a satisfactory level. In the example shown in FIG. 2, the maximum energy deficit $ED_{max}$ for the profile window 42 having the duration $t_{window}$ is the highest maximum energy deficit of the energy deficit incidents 52A, 52B determined within the profile window 42, such that the maximum energy deficit $ED_{max}$ for the profile window 42 is $ED_{YZ}$ occurring at time $t_5$. The system 28, via the control module 26 and upon identifying $ED_{max}$ as the minimum energy requirement to avoid an energy deficit incident 52 from occurring during the profile window 42, transitions the operating mode and/or charging mode of the vehicle 10 as required to provide a state of charge at the energy storage device 22 sufficient to provide the minimum energy requirement, e.g., a SOC threshold corresponding to and sufficient to offset the maximum energy deficit $ED_{max}$, and such that vehicle performance is maintained at a satisfactory level, e.g., acceleration responsiveness and propulsion power are maintained at satisfactory levels, through the duration of the profile window 42.

Figure 3:
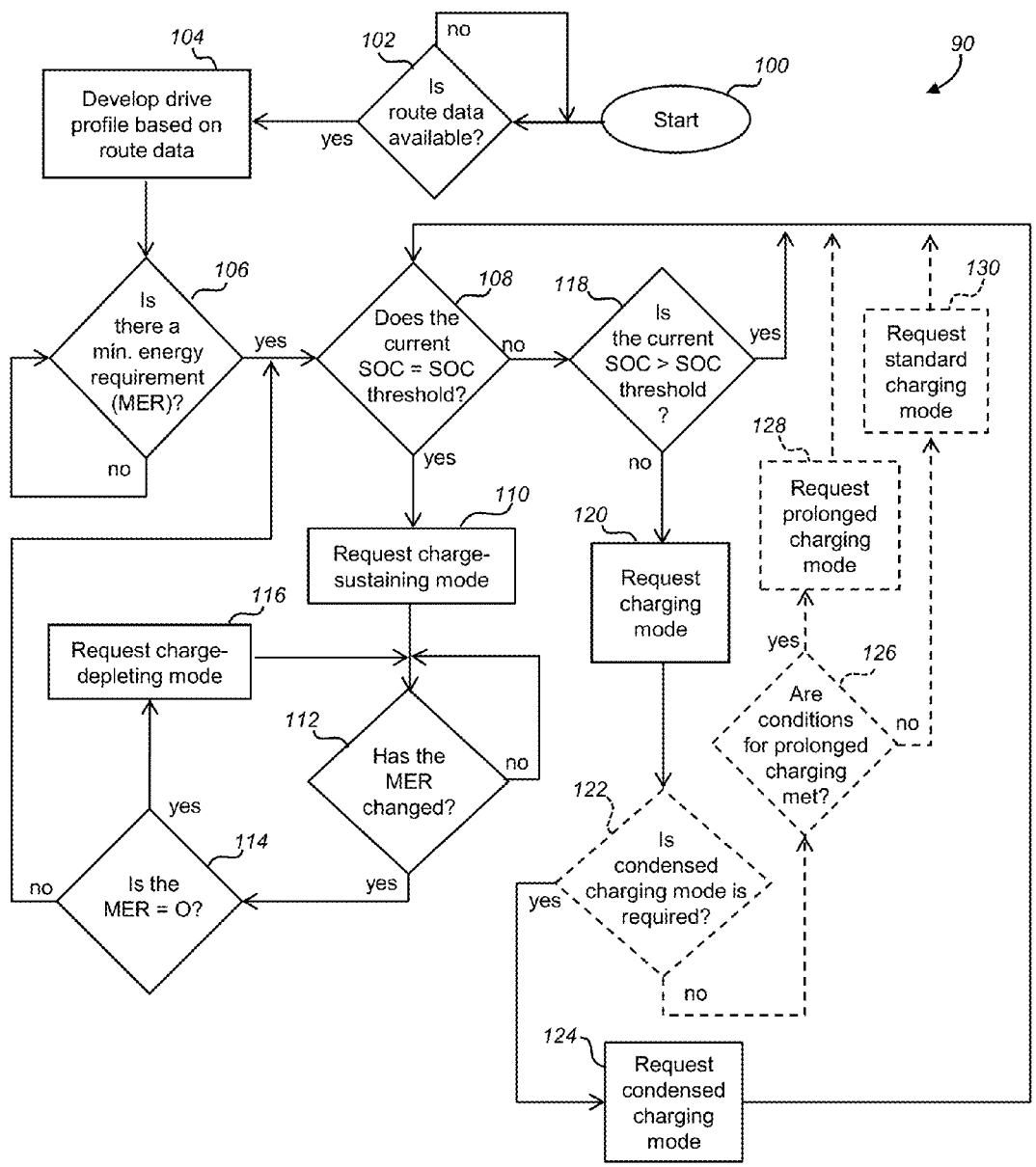
FIG. 3 is a flowchart illustrating a method for controlling the state of charge of a hybrid vehicle using a drive profile and energy deficit distribution defined by the drive profile.
Figure 4:
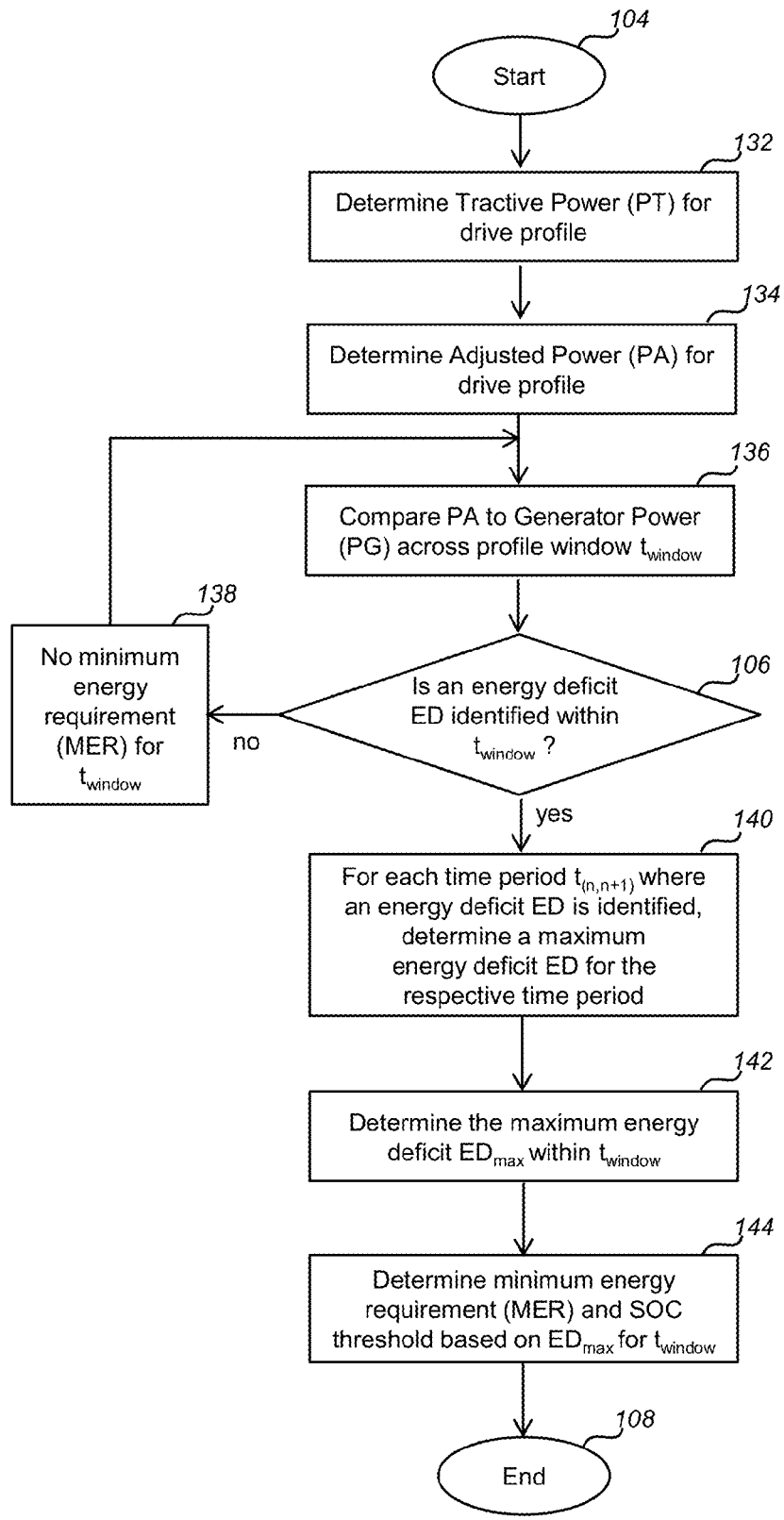
FIG. 4 is a flowchart illustrating a method for developing the drive profile and determining a minimum energy requirement for a profile window of the drive profile.

With reference to FIGS. 3 and 4, a method 90 for adaptively controlling the state of charge (SOC) of the energy storage device 22 of the hybrid vehicle 10 using the system 28 is described herein. The control module 26 can execute the method 90 in order to optimize the use of electrical energy and avoid reduced propulsion performance of the hybrid vehicle 10 during a trip route, by generating a drive profile 40 and energy deficit distribution 50 based at least in part on route data provided by a navigation system 24 to a control module 26 of the vehicle 10. The control module 26 analyzes the energy deficit distribution 50 to identify energy deficits ED in the drive profile 40, and commands the vehicle 10 to transition between operating modes and/or to between charging modes to maintain a SOC of the energy storage device 22 which is equal to or greater than a minimum energy requirement (MER) required to offset the identified energy deficit ED, e.g., to maintain the SOC of the energy storage device 22 at the SOC threshold. In one example, the control module 26 executes the method 90 in a continuous looping manner, where in each loop the control module 26 analyzes a trip segment of the trip route defined by a profile window 42 of the drive profile 50, and transitions the operation of the hybrid vehicle 10 to provide a SOC at the energy storage device 22 which is equal to or greater than the SOC threshold, e.g., equal to or greater than the minimum energy requirement needed to offset the maximum energy deficit $ED_{max}$ identified in the profile window 42.

Referring to FIG. 3, the method 90 begins at step 100. Step 100 entails the control module 26 initiating communication with the navigation system 24 and the powertrain 30 of the vehicle 10. Step 100 may occur, for example, during key-on or start-up of the vehicle 10. At step 102, the control module 26 polls the vehicle 10, including the navigation system 24, for route data. The route data may be route data including a desired trip destination which is entered into the navigation system 24 by a vehicle user. If route data is available, the control module 26 receives the route data and proceeds to step 102. If no route data is available, the control module 26 remains at step 102 and continues to poll the vehicle 10 including the navigation system 24, polling for route data which may be input to the navigation system 24 or otherwise received by the vehicle 10 at a subsequent time. As previously described herein, the route data may include, but is not limited to, a starting point, a trip route, a trip distance, a travel time, speed limits for each trip segment of the trip route, and grade and elevation data of the trip route. At step 104, the control module 26, as previously described, develops a drive profile 40 based on the route data and additional vehicle information, develops an energy deficit distribution 50 based on the adjusted tractive power PA and generator power PG of the drive profile 40, identifies whether an energy deficit ED is indicated by the energy deficit distribution 50, and if so, at step 106 determines a maximum energy deficit $ED_{max}$, a minimum energy requirement (MER) to offset the maximum energy deficit $ED_{max}$, and a SOC threshold defined by the minimum energy requirement, where, as described previously, the SOC threshold is the minimum state of charge which must be available from the energy storage device 22 to avoid the occurrence of the energy deficit incident 52.

As previously described herein, drive profile 40 may be segmented into a plurality of profile windows 42, each profile window 42 defined by a start time $t_{open}$, an end time $t_{close}$ and a duration $t_{window}$, where each profile window 42 represents a trip segment of the trip route of the drive profile 40. In one example, the control module 26 at steps 104 and 106, and as illustrated in additional detail in FIG. 4, is configured to develop the drive profile 40 and analyze each profile window 42 within the drive profile 40 to determine whether a minimum energy requirement is indicated by the energy deficit distribution 50 of each respective profile window 42. As previously discussed, in a preferred configuration the profile windows 42 are overlapping, such that $t_{window}$ of each profile window 42 overlaps $t_{window}$ of a subsequent profile window 42 and the control module 26 analyzes the profile windows 42 in a continuously looping manner. The example of analyzing the drive profile 40 as a series of profile windows 42 is non-limiting, and it would be understood that the drive profile 40 could be analyzed in total for an energy deficit ED, such that in this event the drive profile 40 and the profile window 42 being analyzed would have the same duration $t_{window}$, and the trip segment represented by the profile window 42 would be the entire trip route. Analysis of the entire trip route, e.g., of the entire drive profile 40 within a single profile window 42 may be indicated, for example, in situations where the drive trip route is of relatively short distance and/or duration. It would be understood that analysis of each profile window 42 is preferably completed with sufficient time to transition the operating system 28 of the vehicle 10 from one operating mode to another, and/or from one charging mode to another, such that the vehicle 10 has sufficient time to charge the energy storage device 22 to the SOC threshold corresponding to the minimum energy requirement required to offset the maximum energy deficit $ED_{max}$, prior to the indicated time of occurrence of the energy deficit ED in the drive profile 40, either by transitioning the vehicle 10 into charge-sustaining mode, if the SOC of the energy storage device 22 is equal to the minimum energy requirement, e.g., equal to the SOC threshold, or by transitioning the vehicle 10 into a charging mode to increase the SOC of the energy storage device 22 to the SOC threshold to avoid the occurrence of energy deficit incidents 52, and as such avoid any energy deficit related performance impact, such as reduced propulsion power.

By way of non-limiting example, a trip route, e.g., the distance to the desired destination, may be 500 kilometers long, and the system 28 may be configured such that the profile window 42 represents a trip segment of the trip route which is 100 kilometers in length, providing a sufficient time buffer to transition the operating mode of the vehicle 10 to charge the energy storage device 22 to the SOC threshold prior to the occurrence of an energy deficit ED. The profile window 42 may be scrolled in fixed increments of 10 kilometers, for example, such that the first profile window 42 to be analyzed for an energy deficit ED represents the first 100 kilometers of the trip route, e.g., kilometers 0-100, the second profile window 42 to be analyzed represents kilometers 10-110 of the trip route, the third profile window 42 to be analyzed represents kilometers 20-120 of the trip route, and so on, such that the profile window 42 scrolls every 10 kilometers of the trip route for analysis by the control module 28, and each profile window 42 overlaps a subsequent profile window 42. In this event, it would be understood that time $t_{window}$ would vary from one profile window 42 to the next, for example, due to changes in the vehicle velocity and/or speed limits for the portion of the travel route included in each trip segment represented in a respective profile window 42. For a shorter trip route, for example, a trip route where the total distance to the desired destination may be less than the distance and/or duration of two profile windows 42, for example, a trip route 120 kilometers in length, the trip route may be considered in total, e.g., within a single profile window 42, where the analysis for energy deficit may be repeated for the profile window 42 at time increments to poll for the effect of changing conditions such as actual speed of the vehicle 10, HVAC electrical load on the vehicle 10, etc.

Steps 104 and 106 are shown in additional detail in FIG. 4, beginning with step 104 with the receipt of route data by the control module 26. At step 132, the control module 26 determines the tractive power PT at each time t along the trip route defining the drive profile 40. At step 134, as previously discussed, the control module 26 applies an adjustment factor AF to the tractive power PT to generate an adjusted tractive power PA at each time t along the trip route. At step 136, the control module 26, for each profile window 42, compares the adjusted tractive power PA to the generator power GP for the vehicle 10, as previously described herein, to determine whether an energy deficit ED is indicated within the profile window 42.

The method proceeds from step 136 to step 106 (shown in FIGS. 3 and 4), where at step 106, if no energy deficit ED is identified within the profile window 42, the method proceeds to step 138 where it is determined there is no minimum energy requirement for the profile window 42. From step 138, the method loops back to step 136, where the control module 26 continues in a looping manner to analyze the drive profile 40 and energy deficit distribution 50 within a subsequent, e.g., scrolled, profile window 42 to analyze a subsequent profile window 42 for an energy deficit ED. If at step 106 at least one energy deficit ED is identified within the profile window 42 being analyzed, the method proceeds to step 140, and a maximum energy deficit value ED is determined for each energy deficit incident 52 identified in the profile window 42, and at step 142 the maximum energy deficit $ED_{max}$ is identified for the profile window 42. As previously described and by way of example, in the profile window 42 shown in FIG. 2, two energy deficit incidents 52 occur, with the first energy deficit incident 52A occurring between times $t_1$ and $t_3$ and characterized by a maximum energy deficit of $ED_{WX}$, and the second energy deficit incident 52B beginning at time $t_4$ and continuing to the close of the profile window at $t_{close}$, with the second energy deficit incident 52B characterized by a maximum energy deficit of $ED_{YZ}$ occurring at time is within the profile window 42. As shown in FIG. 2, $ED_{YZ}$ is greater than $ED_{WX}$ such that $ED_{max}$ for the profile window 42 is $ED_{YZ}$. At step 144, the control module 26 determines a minimum energy requirement (MER) equal to the maximum energy deficit $ED_{max}$, and determines a SOC threshold based on the minimum energy requirement, where the SOC threshold is the minimum state of charge (SOC) which must be available from the energy storage device 22 to offset the maximum energy deficit $ED_{max}$, and to thereby prevent the occurrence of an energy deficit during the trip segment represented by the profile window 42. By preventing the occurrence of an energy deficit, the vehicle 10 will avoid, for example, experiencing a reduction in propulsion power, acceleration responsiveness and/or BSFC attributable to an energy deficit. The method then proceeds from step 144 to step 108 shown on FIG. 3.

Referring again to FIG. 3, at step 108 the SOC threshold determined at step 106 is compared with the then current state of charge (SOC) of the energy storage device 22 by the control module 26. If at step 108 the SOC of the energy storage device 22 is equal to the SOC threshold determined at step 106, the method proceeds to step 110 and the control module 26 commands the powertrain 30 and/or the vehicle 10 to operate in a charge-sustaining mode, e.g., hold mode, such that the SOC of the energy storage device 22 is held at a charge level sufficient to provide the minimum energy requirement determined at step 106. The method 90 proceeds from step 110 to step 112, where the control module 26 continues to analyze the drive profile 40 to determine if the minimum energy requirement MER, and the SOC threshold defined therefrom, has changed, for example, by analyzing subsequent profile windows 42 in a looping manner as shown in FIG. 4. If the minimum energy requirement has not changed, the method 90 loops back to step 112, and the control module 26 continues to analyze the drive profile 40 to determine if the minimum energy requirement has changed. If at step 112 it is determined the minimum energy requirement has changed, the method 90 proceeds to step 114.

At step 114, if the minimum energy requirement has been eliminated, e.g., if energy deficits ED are no longer detected in the drive profile 40 and/or the profile window 42 under analysis such that the MER is now zero, the method 90 proceeds to step 116 and the control module 26 commands the powertrain 30 and/or the vehicle 10 to transition to charge-depleting mode, e.g., to a normal operating mode, which may be, for example, one of a fully electric mode or an extended range mode. From step 116, the method 90 loops back to step 112, where the control module 26 continues to analyze the drive profile 40 to determine if the minimum energy requirement MER has changed, for example, by analyzing subsequent profile windows 42 in a looping manner as shown in FIG. 4. If at step 114 it is determined that the minimum energy requirement MER has changed to a value other than zero, e.g., to a value greater than zero, the method 90 loops back to step 108 to compare the SOC threshold corresponding to the changed minimum energy requirement to the then current SOC of the energy storage device 22.

At step 108, if the then current SOC of the energy storage device 22 is not equal to the SOC threshold, the method proceeds to step 118, to determine whether the then current SOC of the energy storage device 22 is greater than the SOC threshold. If at step 118 the SOC is greater than the SOC threshold, sufficient energy is stored in the energy storage device 22 to offset the maximum energy deficit $ED_{max}$ corresponding to the minimum energy requirement, such that the powertrain 30 and/or the vehicle 10 can respond to the energy deficit $ED_{max}$ without a decrease in vehicle performance as a result of the energy deficit $ED_{max}$, and the method loops back from step 118 to step 108 to continue in a looping fashion to compare the then current SOC of the energy storage device 22 to the then current SOC threshold.

If at step 118 the SOC is less than the SOC threshold, the method 90 proceeds to step 120, and the control module 26 commands the powertrain 30 and/or the vehicle 10 to transition into charging mode to charge the energy storage device 22 to increase the SOC of the energy storage device 22 to the SOC threshold. In the example shown in FIG. 3, the method proceeds from step 120 to step 124, and the vehicle 10 is transitioned to a condensed charging mode. In the condensed charging mode, as described previously, the period of time required to charge the energy storage device 22 to the SOC threshold is condensed, e.g., is shorter than the period of time which would be required to charge the energy storage device 22 to the required SOC under standard charging conditions, and as such, the condensed charging mode is a less efficient charging mode than the standard charging mode of the vehicle 10. Advantageously, the condensed charging mode may be more efficient, for example, than a charging mode such as mountain mode, where in mountain mode, which is typically a mode manually selected by a vehicle user, the powertrain 30 is commanded to charge the energy storage device 22 to a preset SOC (mountain mode SOC target) under charging conditions which minimize the amount of charging time to achieve the mountain mode SOC target. In contrast to the method disclosed herein, the mountain mode SOC target may be higher than the SOC threshold determined by analysis of the drive profile 40 such that in mountain mode the energy storage device 22 may be charged to an SOC higher than that required to offset the energy deficit (where the mountain mode SOC target is higher than the SOC threshold), thereby consuming more fuel than charging the energy storage device 22 in condensed charging mode to the SOC threshold. Further, mountain mode charging is typically initiated upon selection by a vehicle user and maintains the SOC of the energy storage device 22 at the mountain mode SOC target until mountain mode is deselected by the vehicle user, such that fuel is consumed in achieving and sustaining the mountain mode SOC target during vehicle operating times when the additional SOC is not required, e.g., before and/or after an energy deficit is indicated by the drive profile 40. In contrast, using the method 90 described herein advantageously continuously analyzes the drive profile 40 for energy deficits and adaptively determines a SOC threshold and/or changes in the SOC threshold occurring during the drive profile, and transitions the vehicle 10 between the charge-sustaining, charge-depleting, and charging modes as indicated by the energy deficit distribution 50 to allow the vehicle 10 to operate in the most fuel efficient mode consistent with the drive profile 40 while ensuring the energy storage device 22 is charged to the SOC threshold at those times during the drive profile 40 when an energy deficit is indicated, without overcharging the energy storage device 22 to a SOC greater than that required to offset the energy deficit ED indicated by the energy deficit distribution 50, and without charging the energy storage device 22 to a preset SOC over a period of time longer than that required to offset the energy deficit ED indicated by the energy deficit distribution 50. Still referring to FIG. 3, at step 124 the energy storage device 22 is charged in the condensed charging mode to the SOC threshold, and the method 90 continues to step 108, to continue in a looping fashion to compare the then current SOC of the energy storage device 22 to the then current SOC threshold.

Referring again to FIG. 3, the method 90 may optionally, when a request for charging mode is made at step 120, determine at step 120 the amount of available charging time, e.g., the amount of time available to charge the energy storage device 22 to the SOC threshold such that the energy storage device 22 at the completion of the charging time has sufficient energy available to offset the occurrence of the energy deficit ED. At step 120, the control module 26 transitions the vehicle 10 to the most energy efficient charging mode which will charge the energy storage device 22 to the SOC threshold within the available charging time. In the example shown, and as previously described, the control module 26 can command the powertrain 30 and/or vehicle 10 to transition between a condensed charging mode, a standard charging mode, and a prolonged charging mode. As previously described, the condensed charging mode is the least energy efficient and requires the shortest amount of charging time to achieve the SOC threshold, relative to the standard and prolonged charging modes, and the prolonged charging mode is the most energy efficient and requires the longest amount of charging time to achieve the SOC threshold, relative to the standard and condensed charging modes. As shown in FIG. 3, the method 90 may optionally at step 120, where a request is made to transition the vehicle 10 into charging mode, determine via the control module 26 the available charging time and command the powertrain 30 and/or vehicle 10 to transition to the one of the condensed, standard and prolonged charging modes which will enable the powertrain 30 to charge the energy storage device 22 to the SOC threshold within the available charging time. If the available charging time is less than the standard charging time, e.g., the charging time required to charge the energy storage device 22 to the SOC threshold when the powertrain 30 is operated in standard charging mode, then at step 122 the determination is made that the condensed charging mode is required, and the method proceeds to step 124, where as discussed previously, the vehicle 10 is transitioned to condensed charging mode to charge the energy storage device 22 to the SOC threshold.

If at step 122, it is determined that the available charging time is equal to or greater than the standard charging time, the method 90 proceeds to step 126, where it is determined whether conditions are met for prolonged charging. For example, the control module 26 will determine if the available charging time is equal to or greater than the prolonged charging time, where the prolonged charging time is the charging time required to charge the energy storage device 22 to the SOC threshold with the vehicle 10 operating in prolonged charging mode. At step 126, other parameters of the vehicle 10, the drive profile 40 and the route data may be considered to determine if conditions for prolonged charging are met, such as the electrical load on the vehicle 10 under the then current operating conditions, which may include for example, a relatively higher electrical load for HVAC usage, severity and frequency of grade and elevation changes impacting the frequency and magnitude of energy deficit incidents along the drive profile 40, the fuel level of the vehicle 10, etc. If at step 126, it is determined by the control module 26 that the available charging time is equal to or greater than the prolonged charging time and the additional vehicle conditions, if any, for prolonged charging are met, then the method 90 proceeds to step 128 and the system 28 transitions the vehicle 10 to prolonged charging mode to charge the energy storage device 22 to the SOC threshold. If conditions for prolonged charging are not met at step 126, the method 90 proceeds to step 130, where the control module 26 transitions the vehicle 10 to standard charging mode to charge the energy storage device 22 to the SOC threshold. The method 90 loops back from step 130 to step 108, for comparison of the then current SOC of the energy device 22 to the then current SOC threshold.

While the best modes for carrying out the invention have been described in detail, those familiar with the art to which this invention relates will recognize various alternative designs and embodiments for practicing the invention within the scope of the appended claims.

The invention claimed is:

1. A method of controlling a hybrid vehicle, the hybrid vehicle including a powertrain, the powertrain including an internal combustion engine, an electric motor-generator characterized by a generator power, a control module, and an energy storage device, the energy storage device being configured to supply electrical energy to the electric motor-generator, the method comprising:
receiving, via the control module, route data regarding a trip route;
determining, via the control module, a drive profile for the trip route based, at least in part, on the route data;
wherein the drive profile includes an adjusted tractive power distribution and the generator power;
determining, via the control module, an energy deficit distribution based on the drive profile;
wherein the energy deficit distribution defines an energy deficit when the adjusted tractive power exceeds the generator power;
determining, via the control module, a minimum energy requirement based on the energy deficit;
determining, via the control module, a state of charge (SOC) threshold defined by the minimum energy requirement;
comparing, via the control module, a state of charge of the energy storage device to the SOC threshold; and
commanding the powertrain, via the control module, to transition to a charging mode and to charge the energy storage device to the SOC threshold when the SOC threshold exceeds a state of charge of the energy storage device to offset the energy deficit.

2. The method of claim 1, further comprising:
commanding the powertrain, via the control module, to transition to a charge-sustaining mode when the state of charge of the energy storage device equals the SOC threshold.

3. The method of claim 1, further comprising:
commanding the powertrain, via the control module, to transition to a charge-depleting mode when the minimum energy requirement is zero.

4. The method of claim 1, further comprising:
determining, via the control module, a tractive power distribution of the desired trip based, at least in part, on the route data and vehicle information; and
applying, via the control module, an adjustment factor to the tractive power distribution;
wherein the adjusted tractive power distribution is determined by applying the adjustment factor to the tractive power mode.

5. The method of claim 1, wherein the route data includes road grade information and an estimated speed for the trip route; and
wherein the adjusted tractive power distribution is based, at least in part, on the road grade information and the estimated speed.

6. The method of claim 1, wherein the energy deficit begins at a beginning time when the adjusted tractive power is greater than the generator capability and concludes at an end time subsequent to the beginning time when a cumulative difference between the adjusted tractive power and the generated power is zero.

7. The method of claim 1, wherein:
the energy deficit is characterized by a maximum energy deficit; and
the minimum energy requirement is equivalent to the maximum energy deficit.

8. The method of claim 1, further comprising:
determining, via the control module, an available charging time based, at least in part, on the drive profile and the energy deficit distribution;
wherein the powertrain in the charging mode operates in one of a condensed charging mode, a standard charging mode, and a prolonged charging mode;
selecting, via the control module, one of the condensed charging mode, the standard charging mode, and the prolonged charging mode based, at least in part, on the available charging time; and
commanding the powertrain, via the control module, to transition to the selected one of the condensed charging mode, the standard charging mode, and the prolonged charging mode to charge the energy storage device to the SOC threshold within the available charging time.

9. The method of claim 8, wherein:
the condensed charging mode is characterized by a condensed charging time;
the standard charging mode is characterized by a standard charging time;
the prolonged charging mode is characterized by a prolonged charging time; and
the standard charging time is greater than the condensed charging time and less than the prolonged charging time.

10. The method of claim 8, wherein the powertrain is characterized by a fuel consumption; and
the fuel consumption of the powertrain operating in the prolonged charging mode is less than the fuel consumption of the powertrain operating in the standard charging mode.

11. The method of claim 1, further comprising:
identifying, via the control module, an initial profile window of the drive profile;
determining, via the control module, an initial minimum energy requirement based the initial profile window; and
commanding the powertrain, via the control module, to operate in one of a charging mode, a charge-sustaining mode, and a charge-depleting mode based on the initial minimum energy requirement.

12. The method of claim 11, further comprising:
identifying, via the control module, a subsequent profile window of the drive profile;
determining, via the control module, a subsequent minimum energy requirement based the subsequent profile window; and
commanding the powertrain, via the control module, to operate in one of a charging mode, a charge-sustaining mode, and a charge-depleting mode based on the subsequent minimum energy requirement.

13. The method of claim 1, further comprising:
receiving the route data, via the control module, from a navigation system.

14. A method of controlling a hybrid vehicle, the hybrid vehicle including a powertrain, the powertrain including an internal combustion engine, an electric motor-generator characterized by a generator power, a control module, and an energy storage device, the energy storage device being configured to supply electrical energy to the electric motor-generator, the method comprising:
receiving, via the control module, route data regarding a desired trip;
determining, via the control module, a drive profile for the desired trip based, at least in part, on the route data;
wherein the drive profile includes an adjusted tractive power distribution and the generator power;
determining, via the control module, an energy deficit distribution based on the drive profile;
determining, via the control module, a first profile window of the drive profile;
determining, via the control module, whether the first profile window includes at least one energy deficit incident defined by the energy deficit distribution, at least in part, when the adjusted tractive power exceeds the generator power.

15. The method of claim 14, further comprising:
wherein when the first profile window is determined to not include at least one energy deficit incident:
commanding the powertrain, via the control module, to operate in one of a charging-depleting mode and a charge-sustaining mode; and
wherein when the first profile window is determined to include at least one energy deficit incident:
determining, via the control module, a maximum energy deficit defined by the at least one energy deficit incident included in the first profile window;
determining, via the control module, an initial state of charge (SOC) threshold;
wherein the initial SOC threshold is defined by the maximum energy deficit of the first profile window;
comparing, via the control module, a state of charge of the energy storage device to the initial SOC threshold; and
commanding the powertrain, via the control module, to operate in a charging mode and to charge the energy storage device to the initial SOC threshold when the initial SOC threshold exceeds the state of charge of the energy storage device.

16. The method of claim 15, further comprising:
determining, via the control module, a plurality of profile windows of the drive profile;
determining, via the control module, whether each respective profile window of the plurality of profile windows includes at least one energy deficit incident; and
wherein when the respective profile window is determined to not include at least one energy deficit incident:
commanding the powertrain, via the control module, to operate in one of a charging-depleting mode and a charge-sustaining mode; and
wherein when the respective profile window is determined to include at least one energy deficit incident:
determining, via the control module, a maximum energy deficit defined by the at least one energy deficit incident included in the respective profile window;
determining, via the control module, a respective state of charge (SOC) threshold for the respective profile window;
wherein the respective SOC threshold is defined by the maximum energy deficit of the respective profile window;
comparing, via the control module, the state of charge of the energy storage device to the respective SOC threshold of the respective profile window; and
commanding the powertrain, via the control module, to operate in the charging mode and to charge the energy storage device to the respective SOC threshold of the respective profile window when the respective SOC threshold of the respective profile window exceeds the state of charge of the energy storage device.

17. The method of claim 14, wherein determining whether each respective profile window of the plurality of profile windows includes at least one energy deficit incident is performed via the control module in a sequence defined by a respective opening time of each respective profile window of the plurality of profile windows.

18. The method of claim 14, wherein:
the trip route comprises a plurality of trip segments;
each respective profile window of the plurality of profile windows is defined by a respective trip segment of the plurality of trip segments.

19. A hybrid vehicle, comprising:
a powertrain including:
an internal combustion engine;
an electric motor-generator characterized by a generator power; and
an energy storage device;
the energy storage device being configured to supply electrical energy to the electric motor-generator;
a control module programmed to:
receiving, via the control module, route data regarding a trip route;
determine, via the control module, a drive profile for the trip route based, at least in part, on the route data;
wherein the drive profile includes an adjusted tractive power distribution and the generator power;
determine, via the control module, an energy deficit distribution based on the drive profile;
wherein the energy deficit distribution defines an energy deficit when the adjusted tractive power exceeds the generator power;

determine, via the control module, a minimum energy requirement based on the energy deficit;

determine, via the control module, a state of charge (SOC) threshold defined by the minimum energy requirement;

comparing, via the control module, a state of charge of the energy storage device to the SOC threshold; and command the powertrain, via the control module, to transition to a charging mode and to charge the energy storage device to the SOC threshold when the SOC threshold exceeds a state of charge of the energy storage device to offset the energy deficit.

20. The hybrid vehicle of claim 19, further comprising:

a navigation system in communication with the control module;

wherein the control module is programmed to receive the route data from the navigation system.

* * * * *